US007749067B2

(12) United States Patent
Frain

(10) Patent No.: US 7,749,067 B2
(45) Date of Patent: Jul. 6, 2010

(54) ELECTRONIC BINGO GAME PLAYER AND METHOD FOR PLAYING ELECTRONIC BINGO

(76) Inventor: John J. Frain, 40 Kildare Walk, Breezy Point, NY (US) 11697

( * ) Notice: Subject to any disclaimer, the term of this patent is extended or adjusted under 35 U.S.C. 154(b) by 295 days.

(21) Appl. No.: 11/551,897

(22) Filed: Oct. 23, 2006

(65) Prior Publication Data

US 2008/0032765 A1 Feb. 7, 2008

Related U.S. Application Data

(60) Provisional application No. 60/831,464, filed on Jul. 18, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. ......................... 463/19; 273/237; 273/269; 463/18

(58) Field of Classification Search ....................... None
See application file for complete search history.

(56) References Cited

U.S. PATENT DOCUMENTS

| | | | | |
|---|---|---|---|---|
| 4,378,940 A | | 4/1983 | Gluz et al. | |
| 4,624,462 A | * | 11/1986 | Itkis | 273/237 |
| 4,747,600 A | * | 5/1988 | Richardson | 463/19 |
| 4,856,787 A | * | 8/1989 | Itkis | 273/237 |
| 5,401,024 A | * | 3/1995 | Simunek | 463/18 |
| 5,657,991 A | * | 8/1997 | Camarato | 273/269 |
| 5,683,295 A | | 11/1997 | Frain | |
| 5,967,895 A | | 10/1999 | Kellen | |
| 6,780,108 B1 | * | 8/2004 | Luciano et al. | 463/19 |
| 6,832,956 B1 | * | 12/2004 | Boyd et al. | 463/19 |
| 7,118,477 B1 | | 10/2006 | Kellen | |
| 2007/0093285 A1 | * | 4/2007 | Lee | 463/19 |

FOREIGN PATENT DOCUMENTS

| | | |
|---|---|---|
| EP | 1082980 | 3/2001 |
| WO | WO 02/092179 | 11/2002 |

* cited by examiner

*Primary Examiner*—John M. Hotaling, II
*Assistant Examiner*—Paul A. D'Agostino

(57) ABSTRACT

An electronic game card allows participants to play multiple game faces, and enables simultaneous game play at different locations. A plurality of display faces are displayed on each card, and additional faces are stored for simultaneous play. Most probable winners of the stored faces are displayed along side the display faces so that the participant can follow stored faces as well. The card may be electronically networked to a local computer which in turn is networked over a larger area to a remote central computer to thereby increase the number of participants in the play group and to increase jackpots.

9 Claims, 7 Drawing Sheets

B-2
I-17
I-16
N-39 98
N-40
G-60
G-55
O-66

FACE 1

| B | I | N | G | O |
|---|---|---|---|---|
| **2** | **17** | **39** | **60** | 73 |
| 4 | 22 | 45 | 48 | 70 |
| 8 | 29 | **40** | **55** | 61 |
| 12 | **16** | 33 | 51 | **66** |
| 6 | 25 | 44 | 69 | 71 |

96 94

FACE 2

| B | I | N | G | O |
|---|---|---|---|---|
| 1 | **16** | **40** | 61 | 74 |
| 7 | 29 | 46 | 49 | 73 |
| 4 | 22 | 45 | 46 | **66** |
| 13 | 18 | 31 | **55** | 62 |
| 8 | 26 | **39** | **60** | 72 |

90

FACE 3

| B | I | N | G | O |
|---|---|---|---|---|
| 1 | 15 | 40 | 62 | 75 |
| 5 | 29 | **39** | 47 | 79 |
| 4 | 23 | 33 | 46 | 65 |
| 19 | 19 | 31 | 54 | 67 |
| 8 | 25 | 38 | 61 | 75 |

94

ELECTRONIC BINGO GAME PLAYER AND METHOD FOR PLAYING ELECTRONIC BINGO

CROSS REFERENCE TO RELATED APPLICATION

This application is based on Provisional Application No. 60/831,464, filed Jul. 18, 2006, the teachings of which are incorporated herein by reference.

BACKGROUND OF THE INVENTION

This invention relates to an electronic bingo game player and a method for playing bingo at different locations using such a apparatus. The teachings of U.S. Pat. No. 5,683,295 are incorporated herein by reference.

It is becoming a challenge to maintain interest and excitement in bingo games played in traditional environments. Many players or participants in bingo play often want to play more than one game face at the same time. Consequently, promoters permit participants or players to use electronic game players capable of tracking multiple faces. The participant enters the called number, e.g. B-6, and the storage device tracks the faces in memory which have that call number. When, at some point, a winning combination is detected, the device announces to the user that a winning face has been determined. This is not a popular arrangement for people who mark cards manually, because manual markers can make a mistake or miss a call number or not recognize a winning face, so there is a perception that those participants with an electronic device have an unfair advantage.

Other disadvantages exist in traditional bingo play. See for example an article entitled CHARITY BINGO TRYING TO "REINVENT ITSELF" posted Jun. 14, 2006 on the USA Today website. Among other things; the condition of the bingo parlors; the number of persons needed to run the games; demographics of the participants; and the limits of the traditional way games are played has caused a decline in popularity of bingo and consequent reduction in profits for the operators. The games are simply not as exciting, and the prizes are limited. The result is a decline of interest and enthusiasm by the participants. Also, competition from other legal gambling outlets has resulted in a decline in traditional bingo activity.

One way that participants and promoters see for adding excitement and versatility to the play experience is by allowing participants to play an increased number of faces. This requires advanced technology. If such advanced technology is employed, it is important that participants are comfortable with improvements in play technology. In other words, the experience should be perceived to be very close to the experience with traditional arrangements using paper faces and ink dabbers. These can be conflicting goals. If a participant is using an electronic game device, the participant really does not play the game in a traditional way. The participant simply enters the call and waits for the game device to announce a winning combination. This is not terribly entertaining. Except for entering the call, there is no interaction of the participant marking the faces with the calls; and there is no excitement as the participant watches the faces develop. When playing with conventional paper and ink dabbers, participants can not, as a practical matter, keep up with more than about twenty or so faces. The invention accomplishes the dual goals of adding more faces while maintaining the excitement and interaction of traditional games. In addition, unfairness perceived by traditional participants is reduced, because they too can participate without significantly changing their way of playing, or more precisely their perception of the play action.

There is also a social aspect to play. In traditional bingo halls, participants line up to buy faces and register for play. While doing so, participants meet and greet their friends and choose places to sit. Many participants are older persons who do not like or are uncomfortable with technology. They don't want to just walk in and sit at a computer terminal to play bingo. They want to feel like they are playing in a traditional way, but with the added excitement of having more faces to play. It is important to maintain a very user friendly environment, i.e. one having the look and feel of a traditional game.

In addition, the ability to enlist help at bingo parlors is increasingly difficult. Some charities rely on volunteers. For profit halls must hire help. In either case, as the action increases, it is necessary to have more workers available to maintain controls, monitor the games and maintain security. It would be advantageous to be able to increase play action without increasing labor requirements. Indeed it would be advantageous to reduce the number of workers while increasing the action.

The above identified '295 patent represents an improvement over prior methods. In the patent, the participant can play multiple faces using an electric touch screen which mimics traditional ink and dauber technology. In the patent, when a number is called, the participant enters the call by touching the number displayed in the first column. The call is highlighted or back lit. The adjacent columns contain additional faces which are displayed simultaneously with the first column. When a number called is highlighted in the first column, that number appearing in other columns is also highlighted. In other words a called number appearing in the first column when actuated by the participant becomes lit up or is highlighted so that it can be seen wherever it appears. One input is thus operable to enter and record call numbers in all faces as they are announced. Accordingly, a participant can easily mark all the faces in play by actuating one key. Matching calls in stored faces are likewise recorded and stored.

Accordingly, there is a need for a technologically advanced way of playing bingo allowing users to play more faces and reducing the number of workers to monitor the game play.

SUMMARY OF THE INVENTION

The present invention is directed to a novel electronic game player or electronic device and a new gaming environment which allows participants to play multiple game faces. The arrangement also enables simultaneous game play at different locations. The advantages of the new electronic game player is that many faces can be played at the same time by all participants yet avoiding the perceived unfairness and boredom associated with automated play. In addition, with more participants higher jackpots are possible and thus there is increased excitement. In addition, the game operators or promoters can run games more efficiently with fewer workers, so that profits can be increased while at the same time allowing the participants to receive attentive service. Also, multiple game locations can be networked for increased action, excitement and efficiency.

The electronic game player of the invention includes, a display for a plurality of fixed faces and a stack of variable faces, a manually actuable input associated with selected ones of the fixed faces for enabling the participant to enter a call as announced; a storage for storing data corresponding to the plurality of fixed and variable faces and the corresponding calls; a probability engine responsive to the variable data for determining which of the stored faces has highest probability of winning upon the occurrence of the call next to be announced; a display for displaying one or more of said high probability faces; and an annunciator responsive to the stored data for announcing the occurrence of a winning combination.

The invention also tracks play and announces call numbers from a central location to allow multiple participants to play multiple faces from multiple locations simultaneously.

According to another feature of the invention, a region of the electronic game player displays optional games which can be played while bingo play is ongoing.

The present invention employs at least one column with an active screen display which changes automatically as play progresses to display one or more stored faces having the highest probability of winning on the next call. Thus, in addition to the visible faces which can be seen by the participant, those faces which can not be seen, but which are possible winners, may be automatically displayed after each call. This improves excitement, because the electronic game player is automatically updated on the status of those stored faces which may be potential winners.

DESCRIPTION OF THE INVENTION

Figure 1:
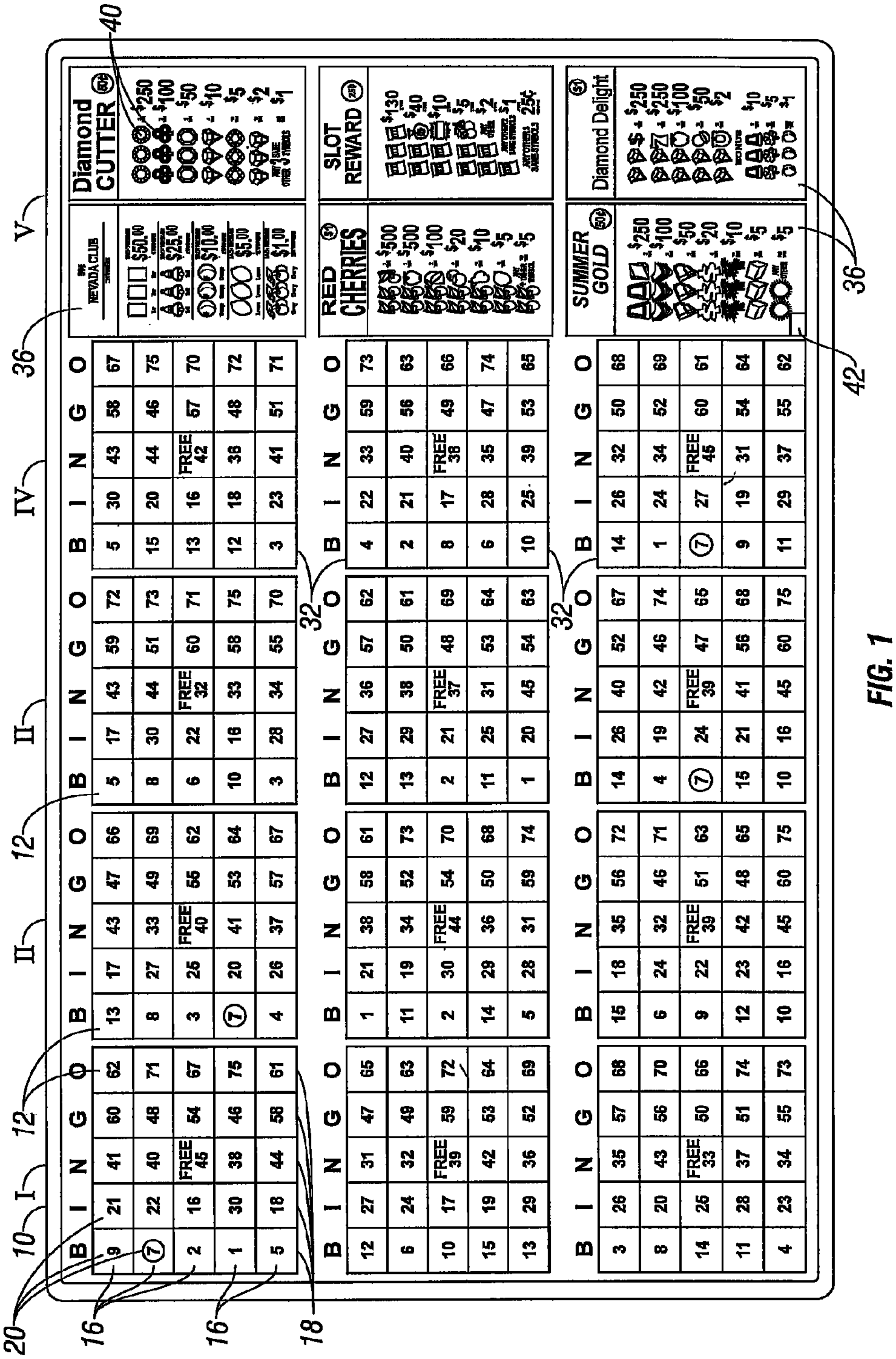
FIGS. 1 and 2 illustrate game electronic game player layouts for different types of bingo play.

The following is a general description of the invention in conceptual terms. The system allows for various remotely located bingo halls to communicate and run games simultaneously under the control of a central computer or controller. The system comprises a master controller or central computer located at a central location. The central controller communicates with the bingo halls by land line or radio. Each bingo hall has a local computer or server that is adapted to communicate with a number of bingo game machines or devices. It is contemplated that as many as 2000 electronic game players may be efficiently served in each of a plurality of game locations.

Each electronic game player, sometimes referred to as a device, has a touch screen with a capacitate interface. The screen displays plates or bingo faces arranged on the screen in an array. In an exemplary embodiment, the device will have fifteen plates in an array of 3 down by 5 across. Each device will have a unique combination of plates, and each device is identified by a unique number. This number will be related to the plates contained in the device.

Of the fifteen plates, the first nine, arranged in an array of 3 columns by 3 rows. In the exemplary arrangement, each column of three plates comprises a mark every time group of plates. In other words, the three plates in each column have seventy five numbers available for marking. The plates are non-repeating fixed display plates. None of the other devices will have the same combination or arrangement of numbers on the fixed plates. The first column of plates on the touch screen functions as an input for the device, so that when a number is touched, the number is highlighted. The plates are connected so that wherever a number appears it becomes highlighted when the number in the first column is touched. In an alternative embodiment, the plates in the columns II and III may be so called random faces. Random faces are those wherein the "free" space has no number.

The fourth column displays three plates at a time in a 1×3 array of plates. These plates may change as the game progresses. In an exemplary embodiment, one hundred variable plates are stored in a stacked memory. These plates are tracked by the electronic game player. Of the plates stored, the electronic game player displays those plates in the stack or storage which are most likely to win on the next call. This therefore allows a participant to track a small number of permanent or fixed plates and a larger number of stored or variable plates. It should be understood that the number of fixed and variable plates may be changed, so that additional variable plates may be added to the display and some of the fixed plates may be reduced or eliminated altogether as desired. Likewise the stored stacked faces may be mark every time or random faces as desired.

The fifth or last column will contain a number of animated displays. These animated displays can be implemented on a rolling cylinder type display, or an open door display, or a stack display. These animated displays may include a plurality of optional games which can be played concurrently as the bingo play proceeds for added excitement or as a diversion from regular play.

Typically, the electronic game player will have sufficient battery life to operate for a play session, e.g. four hours on an overnight charge in a charging cradle.

The local server or controller for each location has a memory and software that allows it to store the contents of electronic game player at each location. There should be no electronic game players in the a particular hall containing duplicate information. In other words, each device in the particular hall is unique. There may be duplicate devices in other halls.

During play, a number is called, and each participant touches the screen when the called number is displayed on one of the three mark every time plates in the first column. Touching this number on the screen causes it to be lit or highlighted automatically. All other numbers on the fixed plates in the second and third columns are likewise highlighted. The stacked plates in memory automatically rearrange themselves in response to an input, so that three plates appear in the forth column with the calls highlighted. The plates appearing in the fourth column are those which the electronic game player determines are most probable winnings on the next call. Thus the participant can see what is needed to win on the next call.

When a win occurs, the device beeps, or flashes, or both to let the participant know if he or she is a winner, but only if the participant marked all the calls. If not, the device will not announce a win and play will continue. The server or local computer also lets the caller know that that there is a possible win in the hall.

The local server has a program that allows the caller to program various types of bingo games to be played in advance, and the server has the ability to reset or clear the game machines. It is also contemplated that the games may be changed remotely from the central server or controller.

A suitable device may be employed at each location to load a storage device purchased by the participant to store credits for use with the games. For example the device may be a solid state random access memory RAM with a USB type connector which stores credits and participant information and the like. The credits may be used to play the optional games in the fifth column. The device may also store the initial buy-in information as well, and may be added to at any time. Such device may be plugged into a corresponding USB slot in the electronic game player and can read, log, and report winnings from play. The stored information in the device may be displayed on the machine display at any time.

Alternatively, the storage device may be a credit card type device as well. For example it may be a gift card type storage device.

In the event of a device failure during a game, the participant must notify the game operator. The participant may be denied the interactive features for the remainder of the current game in play, but the server would protect the game state and continue the play, and award winnings, so that the participant is not disqualified. The device would then be retired and the participant would receive a substitute machine.

In order to prevent theft and misuse of the device, the server may be equipped with a so called watchdog battery backed timer that transmits to each game machine. If the game machine is moved beyond a certain distance from the server, the operating software would be deleted and device will have to be reloaded from the server.

The server is also equipped with a device adapted to receive remote inputs from other events, e.g. a national game, and input these results to the device along with calls.

The game operator has a screen showing all the calls for each game. This system transmits the data to the devices and all numbers are stacked in the server memory.

Remote computers or servers communicate with the central controller by hard wire telecommunications or via a wireless interface. Each server reports to the central controller all devices in play, and the number and type of games played. The local server may communicate with the electronic game players via hard wire or wireless link as desired.

Linked games, that is games played among all locations, require that duplicate devices be programmed to avoid duplications. Accordingly, the central controller has communications capability to program all the electronic game players to avoid such duplications. After the end of linked games, the electronic game players may be reprogrammed or reset to a prior state if desired. It should be understood that the central computer may instruct the electronic game player devices to display mark every time or random faces in the columns II-IV as desired. Random faces increase the number of combinations of faces which are available for play. The first column I is normally a mark every time display because the screen is used as an input device for the electronic game player, and it is therefore easy to keep track of the called numbers right on the screen.

If optional games are not purchased by the participant, advertising may be displayed in free display space.

Known systems allow participants to play multiple game faces. The invention improves known methods by allowing participants to monitor stored faces or plates without having to observe and monitor all of them simultaneously, particularly when the participant wants to play many more faces than he or she could actively monitor. At the same time, the game device requires the participant to monitor the displayed game faces and to call out "bingo" if he or she observes a winning face. In other words, the game play is not merely monitored automatically, but the participant must participate and announce a winning play.

When a participant is playing multiple stored faces, the participant can easily follow them, because only the most probable winning faces appear in the column showing the variable faces. As a result the participant can monitor the displayed faces and the best stored faces as they occur, and thereby fully experience the excitement of the game.

Since certain best prospects for a winning combination are preferentially displayed on the active display, the participant can see enjoy the advantage of having extra faces to play while also being able to observe and follow the most probable winners in real time. This way the participant can enjoy the excitement of multiple face play without excessive anxiety about missing a winning combination. The participant can also experience the excitement of anticipating a possible winning combination for the stored faces. In addition, the participant does not have to try to follow more than a practical number of faces in real time.

If desired, the invention may automatically correct mis or non entered calls after a given delay, of say one call round. This allows participants to err without being disqualified from the entire round. So, if a call is missed or misentered the computer may be programmed to enter or correct an incorrectly or missed call. This feature thus avoids the problem associated with missed calls and allows participants to easily recover from mistakes without being disqualified from play for the remainder of the game in play.

Each card may have a bank of available cash for wagering as the games proceed. Winning moneys are recorded in the bank when a win is verified. This arrangement allows the operator to service many more participants with fewer workers from a central location. This arrangement also allows promoters from different organizations to combine so as to permit more efficient play from a central location.

With centralized game play, increased numbers of participants can participate in simultaneous play at different locations. This increases the action and allows for larger jackpots because more participants increase the jackpot pool available for payout.

Figure 2:
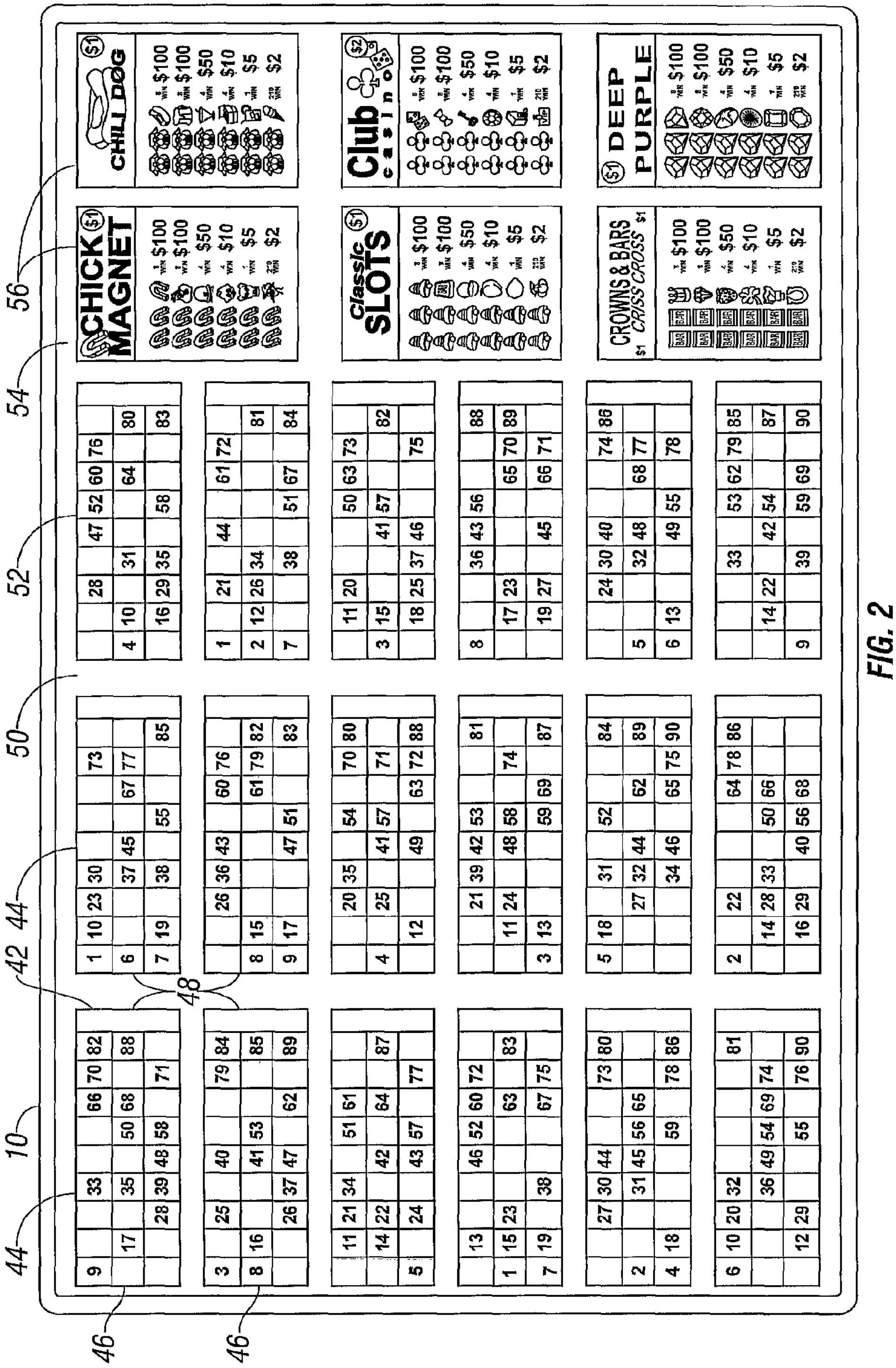

FIGS. 1 and 2 illustrate electronic game players 10. Each have a touch screen 12, and display exemplary layouts for different types of games. FIG. 1 shows the layout for play traditionally practiced in the United States. FIG. 2 illustrates a layout for play traditionally practiced in Europe. Although the game layout in the United States is different than that practiced in Europe, the games played are essentially the same. That is, a number is called and the participant covers or marks the call. When a certain combination of numbers is called, the participant announces a win by calling out "bingo".

In the United States, a typical layout has seventy five numbers divided into five groups of five columns and five rows. The columns are identified by the letters B, I, N, G, and O. The letter B is associated with numbers 1-15; I is associated with numbers 16-30 and so on. Winners are determined by covering rows, columns, and full faces. Other combinations are also available as well. In European play, ninety numbers are laid out in nine columns of eighteen rows with certain empty or free boxes. Participants cover calls and winners are determined by covering certain required numbers in rows and columns.

The display in FIG. 1 has five vertical columns I, II, III, IV, and V. The first three columns have nine faces 14. Each of these faces 14 have five rows 16 and five columns 18 of individual spaces 20. Each space 20 has a number displayed therein. Each space 20 in column I is touch activated. When a number is called, e.g. "B7", the participant touches the space 20 displaying the number "B7" causing an electronic switch to close whereupon the number in the space 20 becomes back lit thereby indicating that the number has been called and has been acknowledged by the participant. According to the invention, all other spaces having the number "B7" displayed therein are simultaneously back lit when block 20 has been activated.

In FIG. 1, the column IV of three variable faces 32 displayed. These variable faces 32 are changeable displays of a number of plates stored in memory 35 (FIG. 4) in the electronic game player 10. When the number "B7" is called, the block 20 in column I is touched. The block 20 is highlighted, and all "B7" blocks in columns I_III and the blocks in the variable faces 32 in column IV are highlighted as well. At the same time, the blocks containing "B7" in the memory 35 are electronically marked when the space 20 is touched. Thus, any plate with a "B7" is electronically marked and when displayed, such block is highlighted.

The variable faces 32 which are displayed in column IV are those faces which appear to have the best chance of winning on the next call. The variable faces 32 may change often as the game progresses and different blocks are marked. Variable faces appearing column IV display the calls made to that point in the game.

Figure 4:
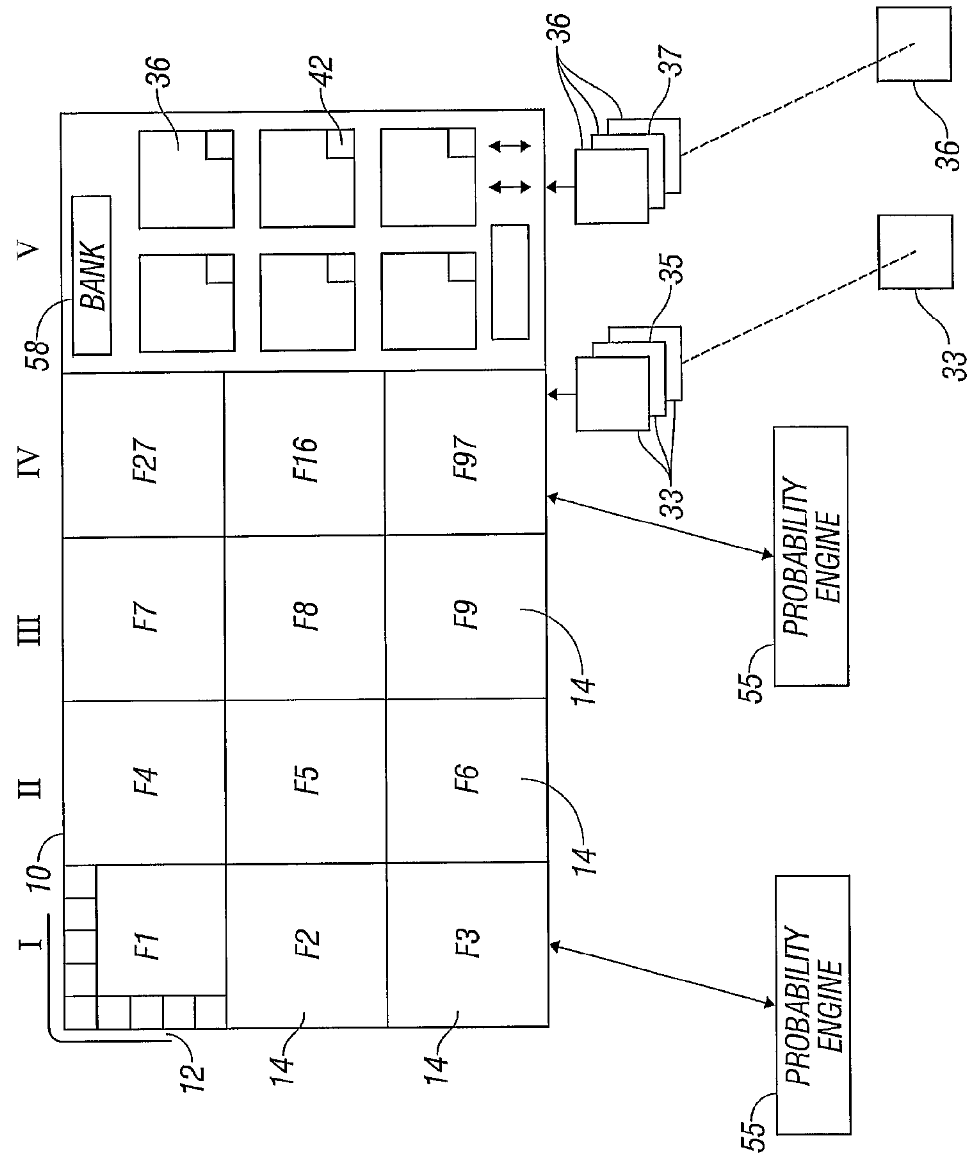
FIG. 4 is a detailed layout of the display on the electronic game player device.
Figure 6:
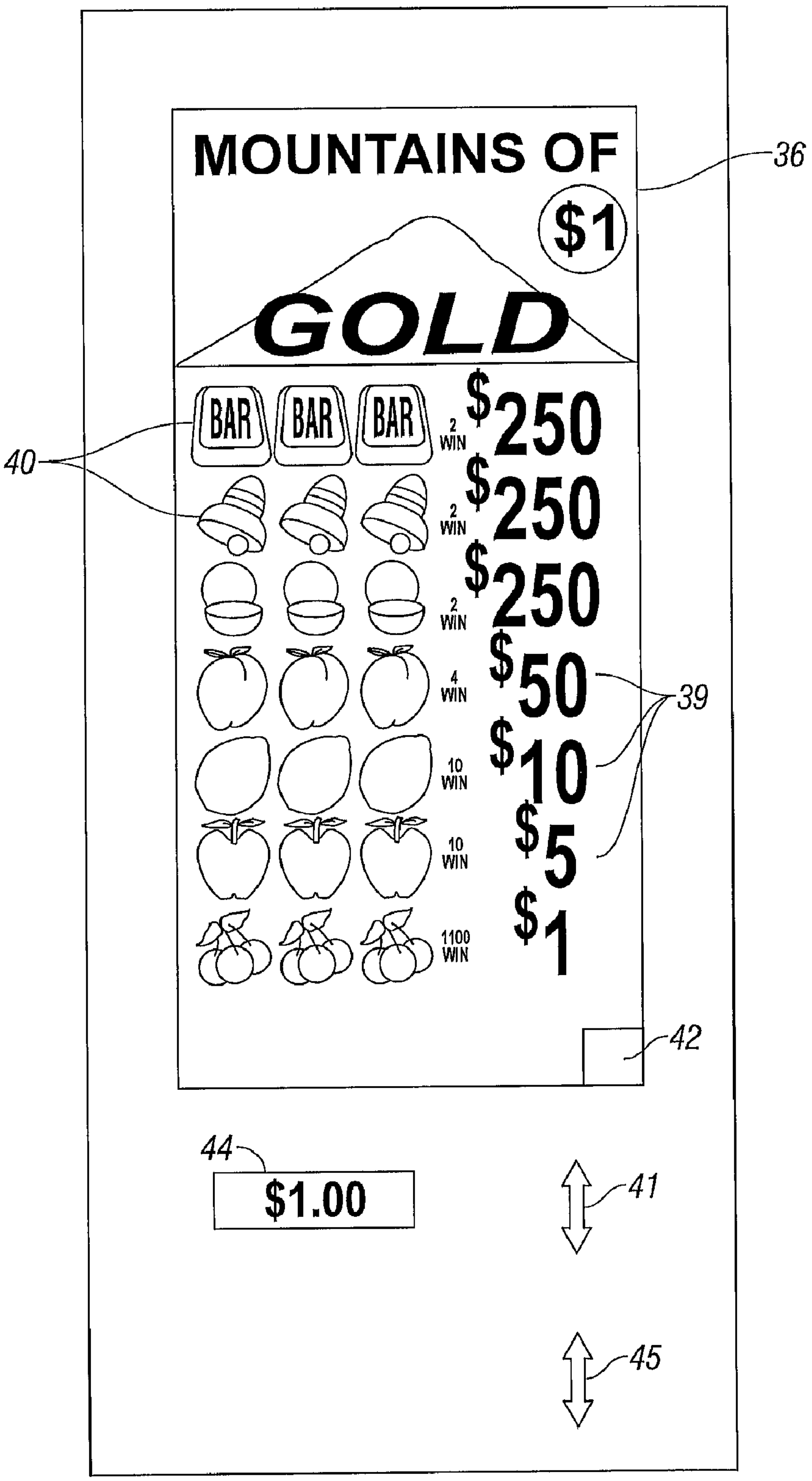
FIG. 6 is a detail of an exemplary optional game face.

Column V of the electronic game player also has a plurality of optional game faces 36. These game faces may be so called tearoff faces which display different kinds of games. For example, the games may look like a slot machine (FIG. 6). The face displays game symbols 40, a start or play symbol 42 and a wager display 44 controlled by up/down arrow 41 symbol. The participant can touch the screen to pick a game; set a wager and start the game. Like a slot machine moving objects may appear on the display 11. After a time, the objects or symbols 40 stop moving and those objects in the boxes which appear determine whether a winning combination is displayed. Other types of games may also appear, some for example may be slot poker, pull tab games and the like. These games may be stored in a stack 37 in memory (FIG. 4). A participant in regular bingo play may thus play an optional game as a diversion.

FIG. 2 illustrates the layout for European play. There is shown an electronic game player display 42 having one or more columns 44 of multiple rows 46 of displayed game faces 48; one column 50 of variable faces 52 and one column 54 of one or more optional faces 56. The participant can play the three or more fixed plates, and can play the most probable winners of the variable display plates.

As shown in FIG. 4, each electronic game player 10 has a bank block 58 which displays the current monetary value credited to the participant. This value is determined by the winnings taken in by the participant during a session of play.

Figures 1A, 5:
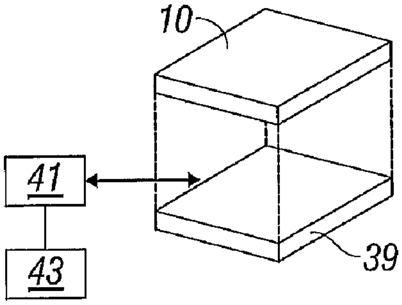
FIG. 1A is an illustration of the electronic game player and a docking cradle coupled to a computer.
FIG. 5 is an illustration of the input portion of the display for fixed faces showing highlighted calls and a list of the calls.

At the beginning of play the participant buys in to the electronic game player by paying for a number of faces. The participant may do this by paying cash or by using a credit card, or debit card, or gift card. The participant may also add faces during play as well. In addition, the participant may add value or credits to the game machine for playing optional games. As illustrated in FIG. 1A, the participant obtains an electronic game player 10 from the operator. The operator docks the device 10 in a docking port 39 or cradle coupled to a local controller 41. The operator loads the game data and collects the game fees. The electronic game player is then turned over to the participant and the play session proceeds. A bank display shows in a bank display 58 the amount of credits or cash that the participant has in the game. When a participant wins a game of bingo, or wins an optional game, such winnings are added to the displayed amount in the bank display 58. Losses are likewise deducted from the bank display. In an alternative embodiment, the participant may pay the game operator for additional variable faces or add value. This process may be facilitated by the credit card, debit card, gift card, or USB device.

At the conclusion of play, the participant turns in the electronic game player and collects his or her net winnings. The buy in; added value; losses and winnings may be paid in cash or directly charged to the debit card or credit card or may be handled in various ways acceptable to the organizer and the participant.

Figure 3:
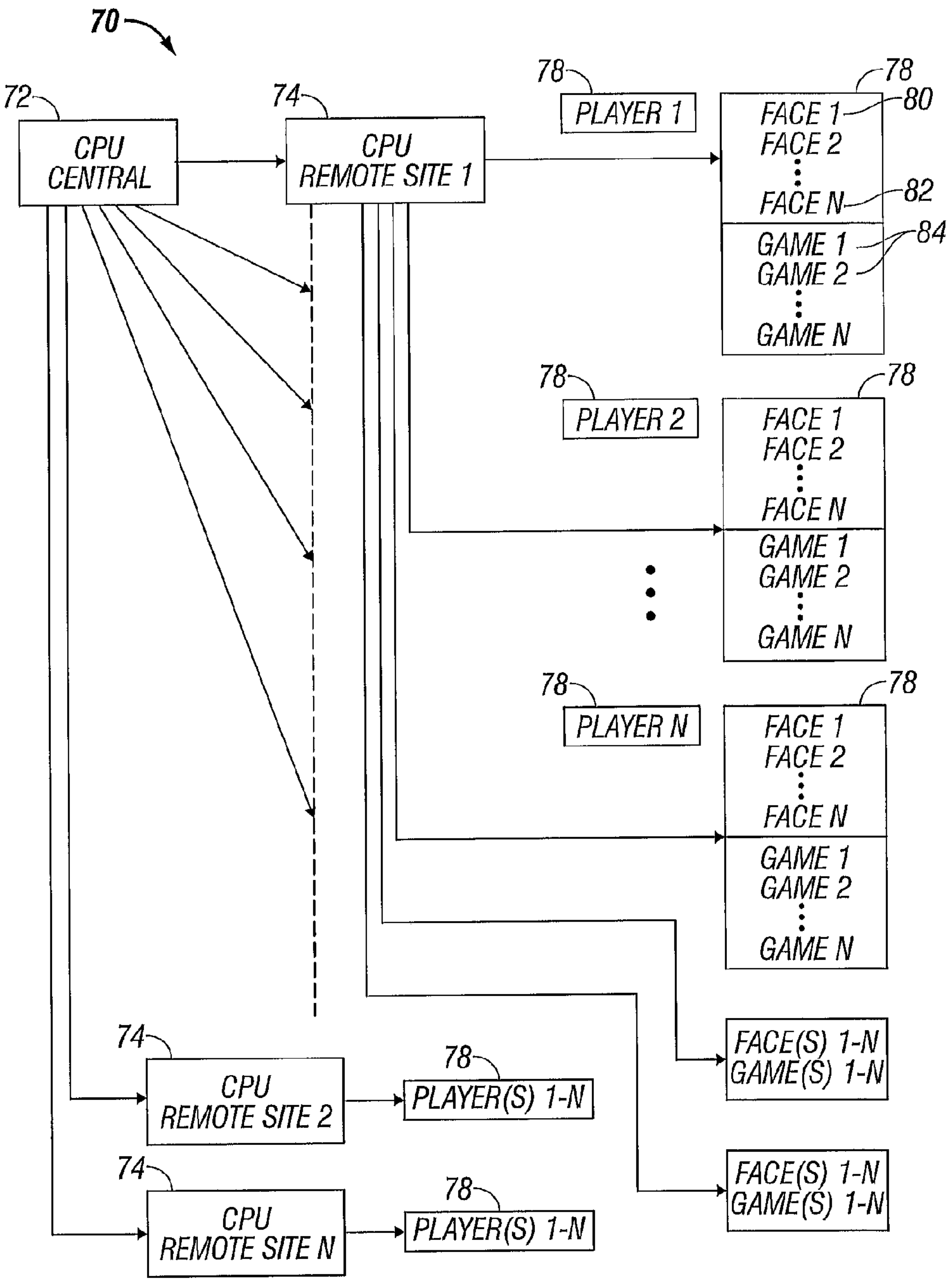
FIG. 3 is a schematic block diagram illustrating a plurality of locations, each having a plurality of electronic game participants networked thereat, which are in turn networked with a central computer.

In accordance with another feature of the invention, there is illustrated in FIG. 3 wide area network 70. The arrangement includes a central computer 72 located at some central location; networked to a plurality of remote or local computers 74 at a plurality of remote locations 76. Each remote remote computer 76 is responsively coupled to a plurality of electronic game players 78. Each device 78 has multiple fixed display faces 80, multiple variable faces 82 and multiple optional games 84. Each participant may play their electronic game player with multiple faces simultaneously with local participants at multiple locations. Calls from the central computer 72 are sent to each local computer 76. The calls are communicated electronically or verbally to the participants who enter the call. In an exemplary embodiment, if a participant misses a call, the call may be automatically entered on the next to occur call. The variable faces in storage receive the calls, which are stored. The variable faces with the best chance of winning are displayed as well. Each participant may also independently play an optional game if desired.

The central computer 72 tracks registration of participants from each location through the remote computers 74. The central computer also tracks game play, the faces, and participant information including winnings and credit card data.

FIG. 4 illustrates an exemplary game machine display in detail. The display on the device 10 includes the columns I-III of fixed display faces 14, the column IV of variable faces 32 and the column V of optional games 36. The additional variable faces 33 are stacked or stored in memory 35; and additional optional games 36 are stacked in memory 37. Also shown are the wager control 44 which can also function as an add or buy control to add value if desired, and the bank display 58 which shows the current value of the card and added wagers or value. Each optional game 36 has a display for selected or moveable options, and a start button 42 for the game. Selected options may be touched to display a hidden item, like a scratch off card, or it may show moveable objects 37, e.g. cherries, lemons, bells and the like typical of slot machine displays. The blocks may also display playing cards, like automated poker and black jack games. Also displayed on the optional games is a pay off or odds block 39 as in typical slot-type games.

Each electronic game player 10 may employ a probability engine 55 to identify which of the faces stored in the card is likely to be a winner on the next call. Such a probability engine can be a counter to count the number of calls that match numbers in storage for each face. The engine would also compare the location of the calls to predict which patterns are closest to a desired pattern. When two or more stored faces have similar probability of winning, another criterion may be employed to refine the prediction. A variety of algorithms may be employed to refine predictions.

FIG. 5 illustrates a typical arrangement of selected faces 90. The faces have numbers 94 displayed, some of which are shown in bold 96. The latter are indicative of a called number that has been selected by the participant. The faces also may represent stored faces in memory with the bold numbers representing a called number. Also shown in FIG. 5 is a call sheet 98 which can be located on the card. The call sheet shows the calls that have been made so the participant can follow the game sequence.

FIG. 6 shows the layout of an exemplary optional game 36. The layout shows the odds chart 39 which displays the payoff for various symbols 40: bells, lemons, cherries and the like, and the payoff for such symbols. Wager selector 41 changes the dollar amount in the wager window 44. Game selector 45 allows the participant to scroll through and select from the memory optional games.

Figure 7:
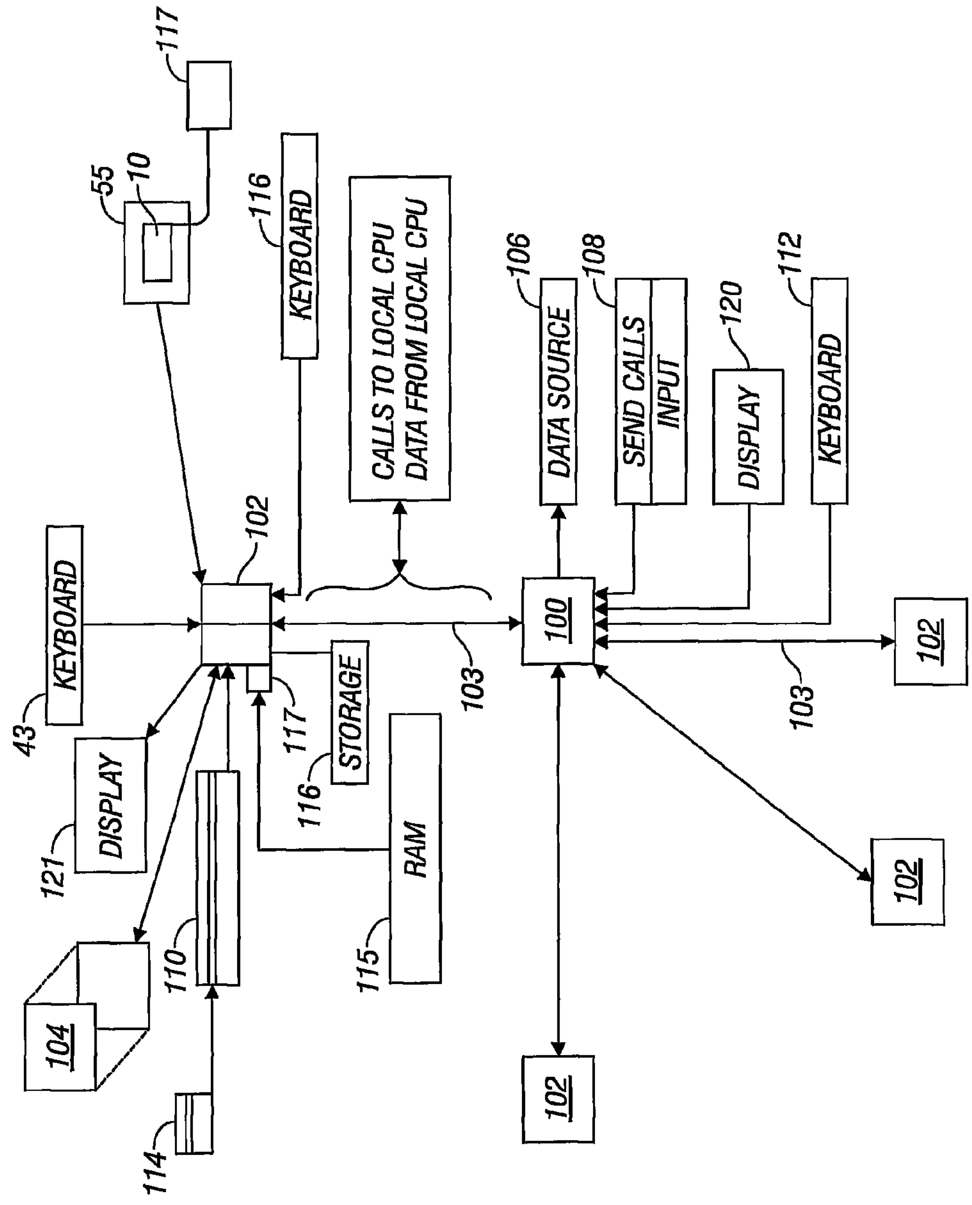
FIG. 7 is a schematic block diagram showing further details of a central computer and one or more local computers serving a number of electronic game players.

FIG. 7 illustrates in schematic block diagram of a more detailed arrangement of a central computer 100, local computer(s) 102, and individual electronic game player(s) 104. According to the invention, the central computer 100 receives data from the local computers via the network 103, which can be a dedicated wide area network or could be a web based network. The central computer 100 stores card data 106 and provides calls via a send call block 108 for communication to the local computer(s) 102.

The data and calls are communicated between the remote and central locations. Game play is controlled centrally, while the local computers control and do accounting for the participants at the remote locations.

In FIG. 7, each of the local computers 102 have a card reader 110 to register various types of cards 114, for example credit cards, debit cards, gift cards and the like. In the case of gift cards, registration information may be loaded on the gift card to speed up registration. The card 114 may also be a so called smart card, which can be automatically tied into the participant's bank or credit card account. Smart cards include data and encryption to secure the accounts. Typically, they include an RF transponder which allows for more complex transactions. Cash transactions; registration; and administrative transactions may be handled by a keyboard. 43 and monitor or display 120.

A USB storage device 115 may be employed, which is coupled with the computer 102 and is locally loaded with credits. The device 115 is then coupled to the game machine via a USB port 117 to activate it.

The system includes a storage device 116 for the card and registration data. A display 120 is employed for the local or remote computer. Card balance appears in the display.

In the exemplary embodiment, when a participant buys in to the game, the memory 116 is adapted to the stored or stacked variable faces and optional games. The memory 116 may be a permanent component of the electronic game player device. Alternatively the memory may be a removable chip or memory card which can be either permanently programmed like a read only memory (ROM) with a unique combination of permanent and variable faces; or the memory 116 may be a programmable random access memory (RAM) card which can be removably inserted in the electronic game player.

In alternative embodiments, various functions including registration, accounting and the like may be implemented centrally or locally or such functions may be shared. In such cases the functional blocks would be located at the appropriate location. It should be understood that web applications sometimes shift functions depending on the particular configuration of the operating system selected by the organizer of the game.

There has thus been described a system for of simultaneously operating a plurality of separate bingo game operations. The system also provides for electronic game cards which display certain faces and selectively display stored variable faces depending on which of said stored faces are most likely to win on the next call. Remote and local computers allow for networked communications.

I claim:

1. A system for one or more participants electronically mimicking in real time conventional bingo play employing printed paper faces displaying arrays of printed numbers in play at selected locations on each face and manual markers for marking numbers called during play; tracking bingo play; and announcing calls from a central location to allow multiple participants to play multiple faces in an electronic game of bingo played simultaneously at different remote locations comprising:

a server at the central location for receiving data from the remote locations, said data representing the number of participants at each location and the number of faces assigned to the participants at each such locations;

a local computer at each location for registering the participants and faces assigned to each respective participant, and for communicating data representing called numbers to the server;

a first communications link between the central location and the remote locations for communicating calls announced to the participants at the various locations for recordation by the participants thereat;

an electronic game player assigned to the one or more participants, each said electronic game player comprising:

a storage device for storing therein one or more faces assigned to the corresponding participant, and for recording called numbers therein; and a display for displaying selected ones of the stored faces as they would appear on conventional printed paper faces of the same type wherein numbers in play are positioned on the screen for selectively displaying called and uncalled numbers having a visually discernable appearance corresponding to a status of numbers printed on a conventional paper face, said selected ones of the displayed stored faces being selectively arranged on the display in accordance with a probability of winning, wherein in the selected displayed faces in the display, uncalled numbers appear unmarked and called numbers appear marked as such numbers would similarly appear on a on a conventional paper face having the corresponding status, wherein at least one of the selected displayed faces in the display is operably responsive to manual entry of current calls into the electronic game player for a selected game of bingo;

each of said number locations on the at least one of the multiple faces on the screen display being touch sensitive for producing a discernable visual change in the appearance of the numbers between the appearance corresponding to uncalled numbers and the appearance corresponding to called and manually marked numbers for mimicking manual marking of a called number which the player may follow in real time, said touch sensitive number locations for producing an output when touched by the player corresponding to the called and uncalled status of the numbers stored in each face, and the at the least one touch sensitive face includes a row or column of mark every time faces, said storage device being responsively coupled to the touch sensitive locations for recording or storing the output defining the corresponding called or uncalled status of the numbers in the stored faces when touched by the player on the at least one face;

a probability engine responsive to entered calls for identifying which of the stored faces is likely to be a winner on the next call and operative for displaying faces in accordance with said probability of winning; and an annunciator for providing an indication to the player of a winning combination of called numbers stored in the storage device for the device.

2. The system of claim 1 including means for entering into the memory data corresponding to the identity of the participant.

3. The system of claim 2, wherein the means for entering into memory data corresponding to the identity of the participant includes at least one of a card reader and a USB memory device.

4. The system of claim 2, wherein the storage is separable from the electronic game player.

5. The system of claim 2, further including a second communications link between the local computer and the electronic game players for communicating data representing called numbers from the local computer to the storage device.

6. The system of claim 5, wherein the game player device is responsive to the local computer for updating mis-entered or non-entered calls stored in the storage device communicated from the local computer to the game player device after a selected interval for correcting said mis-entered or missed calls stored therein.

7. The system of claim 6, wherein mis-numbered or non-entered calls comprises incorrect data entered by the player on the touch screen display which does not represent a called number and data representing a called number which is not entered by touching the touch screen display after such number is called, or both.

8. The system of claim 7, wherein updating of the storage device occurs after a selected interval of at least one call subsequent to an occurrence of entry of said incorrect data therein.

9. A system for tracking bingo play and announcing calls from a central location to allow multiple participants to play multiple faces in a game of bingo played simultaneously at different remote locations comprising:

a server at the central location for receiving data from the remote locations, said data representing the number of participants at each location and the number of faces assigned to the participants at each such locations;

a local computer at each location for registering the participants and faces assigned to each respective participant, and for communicating the data to the server;

a first communications link between the central location and the remote locations for communicating calls announced to the participants at the various locations for recordation by the participants thereat;

a storage device for each electronic game player;

an input for manually entering current calls into the electronic game player;

at least one electronic game player assigned to each participant, each electronic game player having multiple faces stored therein and a storage device for recording calls, said electronic game player having touch screen display for displaying selected ones of the stored multiple faces, wherein at least one of the displayed multiple faces in each electronic game player is designated as an input face for manually entering current calls into the electronic game player for all the faces stored in the storage device for a selected game of bingo, a plurality of said input faces includes a row or column of mark every time faces;

a probability engine responsive to entered calls for identifying which of the stored faces is likely to be a winner on the next call and operative for displaying faces in accordance with said probability of winning; and an annunciator for providing to the player an indication of a winning combination of recorded call numbers.

* * * * *